Patented Nov. 18, 1947

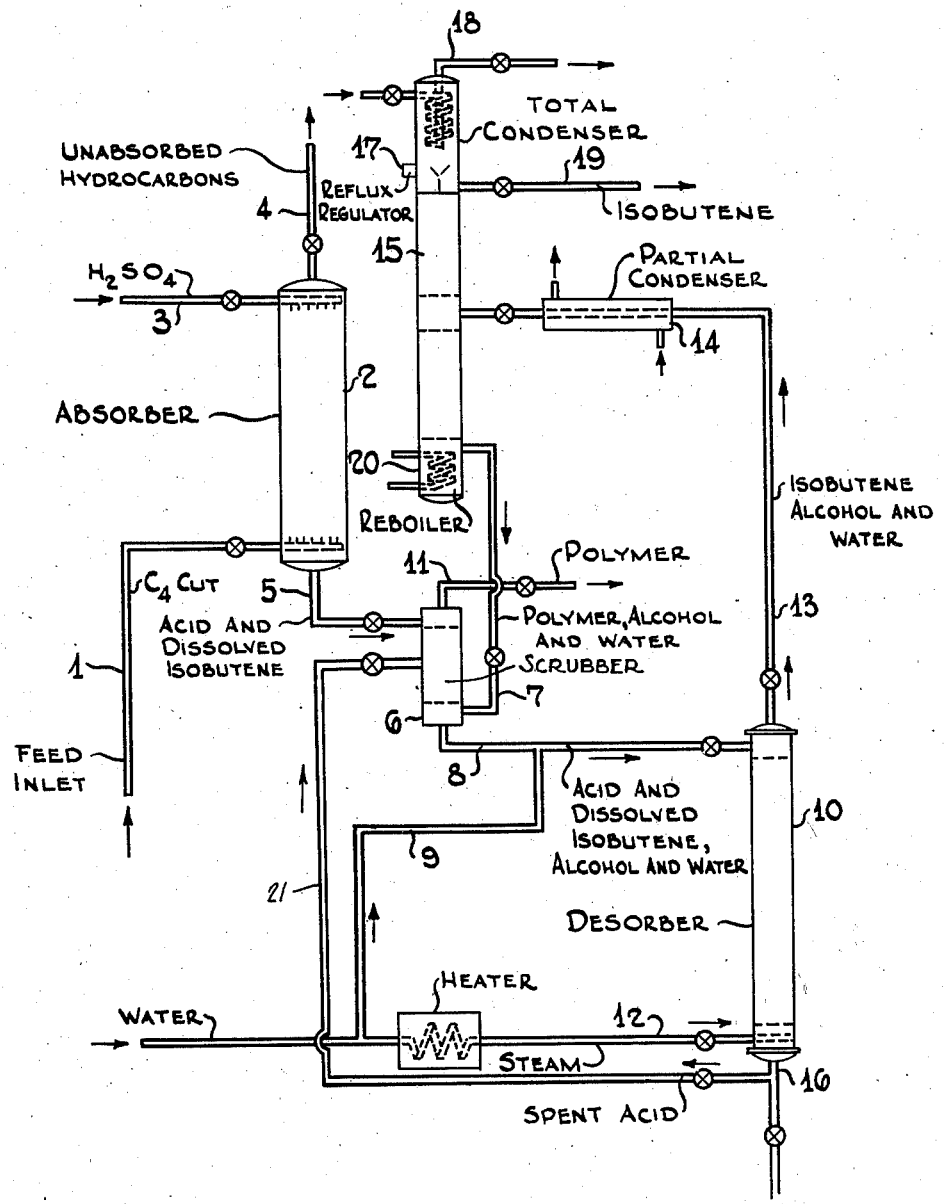

2,431,005

UNITED STATES PATENT OFFICE 2,431,005

RECOVERY AND REGENERATION OF ISOBUTENES

Earl E. Willauer, Cranford, and Insley P. Jones, Basking Ridge, N. J., assignors to Standard Oil Development Company, a corporation of Delaware Application August 19, 1944, Serial No. 550,242

4 Claims. (Cl. 260—677)

The present invention relates to improvements in the process for the separation and recovery of isobutenes from mixtures of olefins and saturated hydrocarbons and more particularly to a method of recovery and regeneration of isobutenes from acid solutions used to extract isobutenes from mixtures of saturated and unsaturated hydrocarbons.

There are many chemical processes in which it is a decided advantage to use a substantially pure isoolefin, unmixed with diluents, such as saturated hydrocarbons. For example, in chemical reactions with the gaseous isoolefins in which pressure is advantageous, the effective pressure is normally the partial pressure of the reactive isoolefin in the mixture. In such cases, substantially pure isoolefins permit much lower pressures to be employed and less gas to be compressed than in the case of gas mixtures poor in reactive isoolefins. Also, in many cases the isoolefin reaction may be reversible, the proportion of the desired product being dependent upon the concentration of reactive isoolefin in the mixture. In such cases, the dilution of the isoolefin in the mixture with a diluent, such as a saturated hydrocarbon, may so affect the yield of the desired reaction product as to render the process unprofitable. Also, the desired reaction product may be very volatile or the chemical reagent used to react with isoolefin may be very volatile and carried away by the relatively unreactive diluent.

When paraffins and olefins are dehydrogenated to form diolefins, the diolefins are separated and the residual hydrocarbons recycled to be further dehydrogenated. The isoolefins present do not dehydrogenate but gradually accumulate and reduce the yields of the diolefins considerably, therefore, it is necessary to remove the isoolefins from the recycle stock if suitable yields are to be obtained.

It is known in the art that isoolefins may be dissolved from a hydrocarbon mixture by contacting with sulfuric acid solutions and that these isoolefins may be recovered by diluting and heating the acid solution. In the processing of a C$_4$ cut it is established practice to remove the isobutene first by contacting the hydrocarbon mixture with a sulfuric acid solution of approximately 65% concentration and at a temperature of approximately 65° F. Wherever the strength of sulfuric acid is mentioned in the specification, it is to be understood that weight percent is intended. The acid extract is diluted with steam and heated to remove overhead a gaseous mixture of isobutene, polymer, tertiary butyl alcohol, and water. This vapor mixture is fractionated for the recovery of isobutenes. The bottoms from this fractionation, consisting of polymer, alcohol and water, are scrubbed with fresh acid extract containing the absorbed isobutene to separate the alcohol and water from the polymer. The alcohol and the water substantially freed of polymer are recycled to the desorber along with the fresh acid extract to insure the maximum isobutene recovery.

However, by this method of operation if it is desired to remove a higher percentage of the isobutene contained in the C$_4$ cut other constituents, particularly butene-1 and butene-2, are also dissolved in the sulfuric acid. Such an acid extract when regenerated will yield isobutene of low purity.

Furthermore, this process has the disadvantage that at the point at which the extract is injected into the regeneration unit a large amount of foaming occurs causing acid to be carried over from the top of the desorber with resultant serious corrosion in the overhead lines and fractionation equipment. The foaming also causes a reduction in isobutene recovery.

When steam stripping normal butylene from acid extracts, the total recycle stream can be returned to the regeneration zone, the polymer being continuously removed with the spent acid. However, in the case of isobutylene regeneration where lower acidities and somewhat lower regeneration zone temperature are employed, the polymer formed is chiefly dimer and co-dimer and as such is too low boiling for removal with the spent acid resulting in a build-up of this material within the regeneration zone.

A satisfactory utilization of the liquid residue from this fractionation, which consists largely of polymer and alcohol, has not previously been developed and it constitutes a considerable loss of isobutenes. By existing procedure, approximately 65–75% of the isobutenes initially present in the C$_4$ cut are recovered whereas approximately 25–35% are converted to other less desirable liquid products. Even when these liquid products were predistilled by complicated procedure involving ternary azeotropes the quantity of isobutenes recovered was relatively low.

It is an object of this invention to substantially increase the amounts of isobutenes that are recovered where sulfuric acid is used as the absorbent for the separation of isobutenes from the saturated and unsaturated hydrocarbons.

Another object of this invention is to recover at least 90 to 98% of the isobutenes in pure form and substantially reduce the amount of undesirable products that are produced.

A still further object of this invention is to prevent injurious foaming when the acid extract is introduced into the desorber.

These and other objects of this invention are attained by diluting the isobutene-acid extract with water prior to its introduction to the regeneration zone so that the acid extract at this point is reduced in acid concentration to between 52 and 53% (calculated on a hydrocarbon-free basis), and by stripping the isobutene from the diluted extract by the use of a smaller amount of steam than would have been necessary for the regeneration had not the initial dilution been made but which is sufficient to further dilute the acid extract in the regeneration zone to between 41 and 45%. However, such a process is applicable only when the olefin/acid mol ratio is not over 1:1 since at higher ratios the heat required as steam for the regeneration of the olefin is just about equal to the allowable water dilution when reducing the acidity of the extract from 65 to 41–45%. Therefore at such ratios it is not permissible to pre-dilute with water.

According to this invention, a $C_4$ cut containing both unsaturated and saturated hydrocarbons is first treated with sulfuric acid of 65% concentration (on a hydrocarbon-free basis) at a temperature approximately 65° F. to remove isobutene that is present, the mol ratio of olefin to acid being maintained at 1:1 or below.

Referring to the drawing, the $C_4$ cut is passed through a pipe line at the bottom of absorber 2 where sulfuric acid of 65% concentration is introduced through pipe 3. The $C_4$ cut passes in countercurrent flow to the sulfuric acid and the unabsorbed gases containing the saturated, together with the unabsorbed unsaturated hydrocarbons, are removed from absorber 2 through pipe 4. The sulfuric acid with the isobutenes in solution is removed from the absorber 2 by means of pipe 5 and passed to scrubber 6 where it passes in countercurrent flow to a mixture of polymers, alcohol and water introduced into scrubber 6 by means of pipe 7. A temperature not over about 60° F. is maintained in scrubber 6. A continuous acid phase is also maintained in scrubber 6. The sulfuric acid with the isobutenes in solution and also the alcohol and water, is removed by means of pipe 8 and mixed with water introduced through line 9. Sufficient water is added through line 9 to reduce the acidity of the extract feed to 52–53% sulfuric acid (calculated on a hydrocarbon-free basis). The mixture of acid extract, alcohol and water thus diluted is passed to desorber 10 while the polymer, substantially free of water and alcohol, is removed from scrubber 6 by means of pipe 11. In desorber 10, steam is introduced in the lower part of desorber by means of pipe 12 and passes in countercurrent flow to the sulfuric acid containing the isobutenes in solution introduced by means of pipe 8. Sufficient steam is added to yield a spent acid of 41 to 45% sulfuric acid concentration (on a hydrocarbon-free basis). The temperature of the desorber 10 is maintained between 150 and 250° F. and it may be operated under atmospheric pressure. Isothermal temperature conditions can be maintained in the desorber by means of outside heating jackets (not shown). The overhead product consisting substantially of isobutenes with a small proportion of polymer and alcohol and water is removed through pipe 13, passed through partial condenser 14 into the center portion of the isobutene fractionator 15. The spent acid is removed from desorber 10 by means of pipe 16. The fractionator 15 is provided with a reflux regulator 17 and a total condenser 18 at the upper part of the fractionator. Substantially pure isobutene of at least 90% purity is removed from the upper part of the fractionator through pipe 19 and the residual liquid consisting of polymers, alcohol and water is recycled from the bottom part of the fractionator through pipe 7 to scrubber 6. A reboiler 20 is provided at the bottom of the fractionator to maintain the desired temperature.

The spent acid of 41 to 45% sulfuric acid concentration removed by pipe 16 may be recycled to the scrubber 6 to scrub the polymer, alcohol and water introduced into scrubber by means of pipe 7. This acid not only serves as an efficient scrubbing agent, but also reduces the olefin/acid molar ratio within the desorber 10. The spent acid and alcohol dissolved therein could be returned to the top or an intermediate point in desorber 10.

Alternately other methods of contacting the $C_4$ cut with the sulfuric acid of 65% concentration may be used such as a turbine-type mixer in which both the $C_4$ cut and sulfuric acid are introduced simultaneously and withdrawn after mixing to a settling chamber to separate the extract phase and the unabsorbed $C_4$ hydrocarbons.

The following table illustrates the efficiency of the process. Isobutene yields of at least 90 to 98% are obtainable by following this process.

| Run Number | 1 | 2 | 3 | 4 | 5 | 6 |
|---|---|---|---|---|---|---|
| Extract Feed: | | | | | | |
| Olefin-Iso/n-Butene-Ratio | 85/15 | | 85/15 | | 85/15 | |
| Olefin/Acid Molar Ratio | 0.3/1.0 | | 0.5/1.0 | | 1.0/1.0 | |
| Wt. Per Cent $H_2SO_4$ (Hydc. Free Basis) | 65 | | 65 | | 65 | |
| Operating Variables: | | | | | | |
| Stripping Steam, #/gal. extract | 4.0 | 2.2 | 4.8 | 2.3 | 3.5 | 2.1 |
| Water Add'n., #/gal. extract | 0.7 | 3.2 | ------ | 2.3 | ------ | 1.9 |
| Spent Acid: | | | | | | |
| Per Cent $H_2SO_4$ | 46.1 | 43.9 | 44.5 | 41.9 | 43.7 | 41.7 |
| Per Cent C | 0.1 | 1.1 | 1.7 | 2.6 | 4.4 | 5.9 |
| Recycle Stream, Vol. Per Cent of Extract Feed | 65 | ------ | 97 | 10 | 16 | 10 |
| Temperatures, ° F.: | | | | | | |
| Desorber Top | 171 | 150 | 169 | 138 | 167 | 136 |
| Desorber Bottoms | 250 | 230 | 215 | 210 | 203 | 210 |
| Isobutene Recovery, Per Cent | 95 | 93 | 95 | 91.5 | 94 | 90 |
| Isobutene Purity, Per Cent | 83 | 90 | 93 | 97.5 | 93 | 97 |

Examination of the above table indicates that the dilution of the extract with water results in a very substantial increase in the purity of the regenerated isobutene with only a slight decrease in the amount of isobutene recovered as compared to that recovered when approximately the same amount of water is added in the form of steam alone. The improved selectivity brought about by the distribution of the total water as steam and as water injection is further indicated by the increase in carbonaceous material remaining with the spent acid, this material being identified as chiefly secondary butyl alcohol. In the case of each extract, it will be noted that the division of the total water resulted in lowered average desorber temperatures, and thereby reduced the quantity of fractionator bottoms stream to be recycled. Furthermore the dilution with water decreased the foaming tendencies considerably.

Although the present invention has been described with a certain degree of particularity, it is to be understood that the present disclosure has been made only by way of example and that numerous changes in the details of the flow plan and other features of the process may be resorted to without departing from the spirit and scope of the invention as hereinafter claimed.

The nature and objects of the present invention having thus been set forth and a specific illustration of the same given, what is claimed as new and useful and desired to be secured by Letters Patent is:

We claim:

1. In the process of separating and concentrating isobutene from a mixture of hydrocarbons containing the same comprising contacting a hydrocarbon mixture containing isobutene with 65% by weight sulfuric acid to produce an acid extract containing dissolved isobutene while maintaining an olefin to acid mol ratio of not more than 1:1, and stripping the resulting acid extract with steam to regenerate the isobutene, the method of increasing the purity of the isobutene regenerated which comprises diluting the acid extract with sufficient water prior to the introduction of the said extract into the regeneration zone so as to dilute the said extract to an acid strength of 52–53% by weight and then stripping the diluted extract with sufficient steam so that the acid strength is maintained in the regeneration zone between 41–45% by weight.

2. A process for separating and concentrating isobutene from its admixture with other hydrocarbons comprising contacting a hydrocarbon mixture containing isobutene with 65% by weight of sulfuric acid at 65° F. to produce an acid extract containing dissolved isobutene, while maintaining an olefin to acid mol ratio of not more than 1:1, diluting the said extract with water sufficient to reduce the acid concentration of the extract to 52–53% by weight, and stripping the diluted extract with steam to further reduce the acidity to 41–45% by weight, to raise the temperature of the extract to 160–220° F. and to regenerate the isobutene.

3. A process of separating and concentrating isobutene from its admixture with other hydrocarbons which comprises the following steps: absorbing isobutene in sulfuric acid solution of about 65% concentration by weight at a temperature of about 65° F., while maintaining an olefin to acid mol ratio of not more than 1:1, passing the sulfuric acid with isobutene in solution in countercurrent flow to a mixture of polymers, alcohol and water obtained in a later stage of the process, separating the polymers from alcohol, water and sulfuric acid, diluting the resultant mixture of acid extract, alcohol and water with water to an acid concentration of between 52–53% by weight, and passing the resultant diluted mixture into a regenerating zone, introducing sufficient steam into the regeneration zone to further reduce the acid concentration to between 41–45% by weight to raise the temperature to between 160–220° F., removing from the regeneration zone an overhead of isobutene, polymers, alcohol and water and fractionally distilling the same to separate substantially pure isobutene and a residual liquid containing the polymers, alcohol and water, and recycling the residual liquid mixture of polymers, alcohol and water to said countercurrent contact with the sulfuric acid with isobutene in solution.

4. Process of separating and concentrating isobutene from mixtures of saturated and unsaturated hydrocarbons containing isobutene which comprises contacting a mixture of saturated and unsaturated hydrocarbons containing isobutene with sulfuric acid of about 65% by weight of concentration at a temperature of 65° F., whereby isobutene dissolves in said acid, maintaining an olefin to acid mol ratio of not more than 1:1, passing the sulfuric acid with isobutene in solution in a scrubbing zone in countercurrent flow to a mixture of polymers, alcohol and water obtained in a later stage of the process, separating the polymers from alcohol, water and sulfuric acid, diluting the resultant mixture of acid extract, alcohol and water with sufficient water to reduce the acid concentration to between 52 and 53% by weight, stripping the acid solution with steam in a stripping zone to further reduce the acid concentration to 41–45% by weight and raise the temperature of the diluted acid mixture to 160–220° F. whereby polymers, alcohol and water are formed, separating an overhead fraction of isobutene, polymers, alcohol and water from the diluted acid solution thus leaving a residual sulfuric acid solution of 41–45% by weight concentration, distilling the isobutene from the mixture of isobutene, polymers, alcohol and water to leave a mixture of polymers, alcohol and water, passing the residual mixture of polymers, alcohol and water to said scrubbing zone and recycling said acid solution of 41–45% by weight concentration to said scrubbing zone as an additional scrubbing agent therein.

EARL E. WILLAUER.
INSLEY P. JONES.

REFERENCES CITED

The following references are of record in the file of this patent:

UNITED STATES PATENTS

| Number | Name | Date |
| --- | --- | --- |
| Re. 22,268 | Bannon et al. | Feb. 16, 1943 |
| 2,007,159 | Engs et al. | July 9, 1935 |
| 2,012,785 | Deanesly et al. | Aug. 27, 1935 |